United States Patent [19]

Greenberg

[11] Patent Number: 4,719,127
[45] Date of Patent: Jan. 12, 1988

[54] AQUEOUS CHEMICAL SUSPENSION FOR PYROLYTIC DEPOSITION OF METAL-CONTAINING FILM

[75] Inventor: Charles B. Greenberg, Murrysville, Pa.

[73] Assignee: PPG Industries, Inc., Pittsburgh, Pa.

[21] Appl. No.: 463,194

[22] Filed: Feb. 2, 1983

[51] Int. Cl.$^4$ .............................................. B05D 5/06
[52] U.S. Cl. .................................. 427/165; 65/60.52; 427/168; 427/226; 427/314; 427/421; 427/427
[58] Field of Search ............... 427/314, 421, 427, 226, 427/190, 180; 65/60.52, 165, 168

[56] References Cited

U.S. PATENT DOCUMENTS

| | | | |
|---|---|---|---|
| 3,107,177 | 10/1963 | Saunders et al. | 427/314 |
| 4,389,816 | 9/1981 | Fogelburg et al. | 427/314 |
| 4,397,671 | 8/1983 | Vong | 427/190 |

Primary Examiner—Janyce A. Bell
Attorney, Agent, or Firm—Donna L. Seidel

[57] ABSTRACT

A method is disclosed for depositing metal containing films using relatively water-insoluble coating reactants by dispersing said coating reactants in ultrafine powder form into an aqueous medium containing a wetting agent to form an aqueous chemical suspension.

14 Claims, 1 Drawing Figure

4,719,127

AQUEOUS CHEMICAL SUSPENSION FOR PYROLYTIC DEPOSITION OF METAL-CONTAINING FILM

BACKGROUND OF THE INVENTION

The present invention relates generally to the art of pyrolytic deposition of metal oxide films, and more particularly to the pyrolytic deposition of metal oxide films from aqueous compositions of coating reactants.

The pyrolytic deposition of metal oxides onto a glass surface is described in U.S. Pat. No. 3,660,061 to Donley et al. Organometallic salts, preferably acetylacetonates, are dissolved in an organic vehicle such as methylene chloride. Other suitable solvents include aliphatic and olefinic halocarbons, halogenated hydrocarbons, alcohols, and nonpolar aromatic compounds such as benzene and toluene. The organic solution is sprayed onto a hot glass surface where it thermally decomposes to form a metal oxide film which alters the reflectance and transmittance of solar energy by the glass.

Current interest in eliminating the health and environmental hazards of using large volumes of organic solvents has encouraged the development of aqueous coating compositions. It is known from U.S. Pat. No. 2,688,565 to Raymond that light reflecting coatings of cobalt oxide may be deposited by contacting a hot glass surface with an aqueous solution of cobalt acetate. However, such films have a grainy, irregular texture and poor acid resistance evidenced by debonding of the film.

U.S. Pat. No. 4,308,319 to Michelotti et al discloses the pyrolytic deposition of a durable, uniform, solar energy reflecting spinel-type film from an aqueous solution of a water soluble cobalt salt and a water soluble tin compound.

U.S. patent application Ser. No. 463,195 filed on even date herewith by V. A. Henery discloses pyrolytic deposition of metal oxide films from aqueous suspensions wherein organometallic coating reactants are physically suspended in aqueous media by means of vigorous and continuous agitation.

SUMMARY OF THE INVENTION

The present invention involves the pyrolytic deposition of light and heat reflective metal oxide films having similar spectral, physical and chemical properties in comparison with films pyrolytically deposited from organic solutions. However, films in accordance with the present invention are pyrolytically deposited from an aqueous suspension wherein organometallic coating reactants typically used in organic solutions are chemically suspended in an aqueous medium by use of a chemical wetting agent in combination with extremely fine powder reactants. The organometallic coating reactants chemically suspended in an aqueous medium may be pyrolytically deposited to form metal oxide films on a hot glass substrate using conventional spray equipment, and under temperature and atmosphere conditions generally encountered in pyrolytic coating operations. As a result, commercially acceptable transparent metal oxide films comparable to those currently deposited from organic solutions can now be produced using the same coating facilities while eliminating the costs and hazards of organic solvents by employing aqueous suspensions.

DESCRIPTION OF THE DRAWING

The figure illustrates hoppers 1 equipped with scales 2 which feed powdered coating reactants into a jet mill 3 which pulverizes the coating reactants to ultrafine powder which is conveyed to a baghouse 4 and delivered through an air lock 5 into a mixing tank 6 equipped with a stirrer 7 which gently stirs the aqueous suspension. The aqueous suspension is delivered by pump 8 through a filter 9 which removes impurities or undispersed coating reactant en route to spray guns (not shown).

DESCRIPTION OF THE PREFERRED EMBODIMENTS

Figure 1:
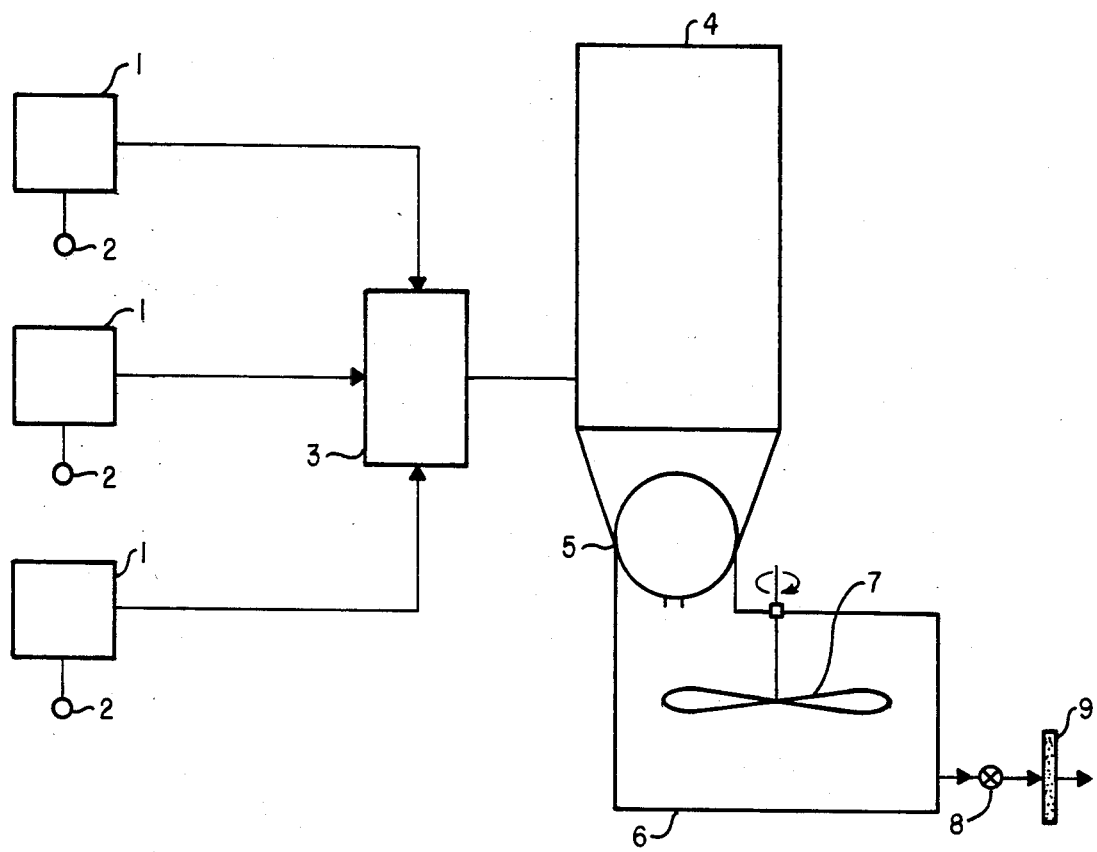

While interest in eliminating the health and environmental hazards, as well as the cost, of organic solvents in pyrolytic coating processes has encouraged the use of aqueous coating solutions, many coating reactants, particularly organometallic coating reactants, have such low solubility limits in water that pyrolytic deposition has not been feasible. For example the acetylacetonates disclosed in U.S. Pat. No. 3,660,061 for pyrolytic deposition of metal oxide films on glass produce high quality, high performance coated products. However, their solubilities in water are relatively low; at 30° C. only 0.3% for cobaltic acetylacetonate and only 0.15% for chromic acetylacetonate. At such concentrations, very large volumes of aqueous solutions would be required, resulting in prohibitive cooling and possible breakage of the glass as well as unacceptably slow film formation rates.

In accordance with the present invention, relatively water-insoluble coating reactants, such as acetylacetonates, are chemically suspended in an aqueous medium by utilizing very fine micron-sized particles of coating reactants in combination with a chemical wetting agent. Thereby, concentrations as high or higher than those obtainable in organic solvents may be achieved in an aqueous suspension. The resulting aqueous suspension may be applied by conventional means, typically spraying, to a substrate to be coated, particularly a hot glass surface, preferably a float glass ribbon.

Although acetylacetonates are the preferred coating reactants in accordance with the present invention, various other organometallic coating reactants may also be employed, as well as relatively water-insoluble compounds in general. The principle of chemically suspending a relatively insoluble coating reactant in an aqueous medium has wide applicability in the field of pyrolytic deposition of films.

In preferred embodiments of the present invention, relatively water-insoluble coating reactants are obtained in solid, powder form. The powder is jet milled to a uniform, fine powder having particles typically less than 10 microns, preferably from about 2 to 5 microns, in diameter. In typical coating processes, when a mixture of metal oxides is desired in the film, organometallic coating reactants are first mixed together in the desired proportions, jet milled to obtain the desired particle size, and then added to the aqueous medium which contains a chemical wetting agent in order to form a chemical suspension.

The aqueous medium is preferably distilled or deionized water. However, if a more viscous medium is desired, a mixture of water and glycerol or other water-miscible organic thickener, may be used. The aqueous medium further comprises a wetting agent which acts to disperse, deaerate and suspend the ultrafine coating reactant particles. Various wetting agents, including anionic, nonionic and cationic compositions, are suitable, in amounts which are determined empirically depending on the wetting agent, the coating reactants and their concentrations, and the aqueous medium. The essential feature of the present invention involves the use of a wetting agent in combination with ultrafine particles of coating reactant to form a chemical suspension in an aqueous medium. The wetting agent displaces air entrained in the powder, and promotes dispersion and suspension of the powder particles by wetting their surfaces. Without the chemical wetting agent, the ultrafine particles would float on the surface of the aqueous medium.

In a most preferred embodiment of the present invention, a mixture of metal acetylacetonates is blended, jet milled to a particle size less than 10 microns, and added with stirring to water which contains a wetting agent. An aqueous suspension is formed which is a true chemical suspension as evidenced by the fact that after storage for more than 3 months with no stirring or mixing, very little separation or settling of the coating reactants from the aqueous suspension has occurred. The aqueous suspension is delivered by means of conventional pyrolytic spray equipment to the surface of a hot float glass ribbon. The coating reactants pyrolyze to form a metal oxide film having similar spectral, physical and chemical properties to a film formed by pyrolysis of the same coating reactants in an organic solution. Moreover, films pyrolytically deposited from aqueous suspensions in accordance with the present invention exhibit faster growth rates than the growth rates measured for films pyrolytically deposited from organic solutions, typically about one third faster. This faster growth rate enables the deposition of acceptable films at faster line speeds.

The present invention will be further understood from the description of specific examples which follow.

EXAMPLE I

An aqueous suspension is prepared by blending 117.7 grams of cobaltic acetylacetonate, 30.2 grams of ferric acetylacetonate and 41.0 grams of chromic acetylacetonate per liter of suspension, jet milling the powders to an average particle size less than about 10 microns, and adding the mixture to water containing 0.3 percent by volume of a nonionic wetting agent which comprises propylene oxide polymer and propylene glycol initiator. Such a wetting agent is available as Pluronic L-31 from BASF Wyandotte Corp. The aqueous suspension thus formed is pumped through a filter as shown in FIG. 1, and delivered by means of spray guns to the surface of a glass sheet which is at a temperature of about 1100° F. The organometallic coating reactants pyrolyze to form a mixed metal oxide film comparable in spectral, physical and chemical properties to the films formed from organic solutions of the same reactants as taught in U.S. Pat. No. 3,660,061, the disclosure of which is incorporated herein by reference. Such comparable films are formed at a growth rate about 33 percent faster than the rate of film formation experienced with organic coating solutions.

EXAMPLE II

During a coating process as described in Example I, exhausted material is recovered in a reclamation baghouse, similar to the collection baghouse illustrated in FIG. 1. The metal acetylacetonates are recovered by solution in methylene chloride. The dried powder is again jet milled for an average particle size less than about 10 microns. Specific metal acetylacetonates are added as needed to establish the proportions in Example I. The reconstituted powder is chemically suspended in an aqueous medium containing wetting agent and delivered to a hot glass substrate as in the previous Example, resulting in a coating with substantially identical properties, indicating that recovery and reuse of the reactants are commercially feasible.

EXAMPLE III

A dry powder mixture of 117.7 grams per liter of suspension cobaltic acetylacetonate, 30.2 grams per liter ferric acetylacetonate and 41.0 grams per liter chromic acetylacetonate is jet milled to an average particle size of about 10 microns or less, and dispersed in an aqueous medium comprising 60 percent by volume water and 40 percent by volume glycerol, which contains 0.3 percent (of combined volume) Pluronic L-31 wetting agent. The aqueous suspension is sprayed on the surface of a hot glass substrate, and forms a durable film of excellent quality at a film growth rate comparable to that of organic coating solutions.

EXAMPLE IV

A mixture of acetylacetonates is milled and suspended as in the previous examples. The aqueous medium comprises 60 percent by volume water and 40 percent glycerol. The aqueous suspension medium further comprises 0.3 percent (based on total volume of the water and glycerol) of a nonionic alkaryl polyether alcohol available as Triton X-100 from Rohm and Haas. The aqueous suspension is sprayed on a hot glass surface as in the previous examples to form a durable metal oxide film.

The above examples are offered to illustrate the present invention. Various other coating reactants, wetting agents, concentrations, additives, substrates, and temperatures may be used to form a wide variety of coatings from aqueous suspensions. For example, other suitable wetting agents include nonionic polypropylene oxide compositions; 1,1,4,4-tetraalkyl-2-butyne-1,4 diol; and anionic lauryl sulfate compositions at various concentrations. The scope of the present invention is defined by the following claims.

I claim:

1. A method for depositing a metal-containing film on a substrate which comprises the steps of:
   a. dispersing a relatively water-insoluble coating reactant into an aqueous medium containing a wetting agent to chemically suspend said reactant in said aqueous medium to form an aqueous suspension; and
   b. applying said aqueous suspension of chemically suspended coating reactant to a surface of a substrate at a temperature sufficient to cause said coating reactant to react thereby depositing a film on said substrate surface.

2. The method according to claim 1, wherein said coating reactant is an organometallic composition.

3. The method according to claim 2, wherein said organometallic composition comprises metal acetylacetonate.

4. The method according to claim 3, wherein said organometallic composition comprises a mixture of cobalt, iron and chromium acetylacetonates.

5. The method according to claim 1, wherein said aqueous medium is water.

6. The method according to claim 5, wherein the aqueous medium further comprises a water-miscible solvent to increase the viscosity of the aqueous medium.

7. The method according to claim 6, wherein the water-miscible solvent is glycerol.

8. The method according to claim 1, wherein the wetting agent is a nonionic polypropylene oxide composition.

9. The method according to claim 1, wherein the wetting agent is 1,1,4,4-tetraalkyl-2-butyne-1,4 diol.

10. The method according to claim 1, wherein the wetting agent is an anionic lauryl sulfate compound.

11. The method according to claim 1, wherein the substrate to be coated is glass.

12. The method according to claim 11, wherein the glass substrate is contacted with an aqueous suspension of metal acetylacetonates.

13. The method according to claim 12, wherein the glass substrate is contacted with an aqueous suspension of metal acetylacetonates at a temperature sufficient to pyrolyze the metal acetylacetonates to form a metal oxide film.

14. The method according to claim 13, wherein the glass is contacted with an aqueous suspension of cobalt, iron and chrome acetylacetonates.

* * * * *